United States Patent [19]
Amemiya et al.

[11] Patent Number: 5,113,383
[45] Date of Patent: May 12, 1992

[54] INFORMATION REPRODUCING SYSTEM AND METHOD

[75] Inventors: Naomi Amemiya; Koji Yamagishi; Kunio Matsumoto; Naoki Masaki, all of Tokorozawa, Japan

[73] Assignee: Pioneer Electronic Corporation, Tokyo, Japan

[21] Appl. No.: 479,808

[22] Filed: Feb. 13, 1990

[30] Foreign Application Priority Data

Feb. 13, 1989 [JP] Japan ................................. 1-34297

[51] Int. Cl.⁵ ...................... G11B 17/22; G11B 17/26
[52] U.S. Cl. ....................................... 369/33; 369/36
[58] Field of Search ..................... 369/32, 33, 34, 35, 369/36, 38, 39; 360/92, 98.05, 98.01

[56] References Cited

U.S. PATENT DOCUMENTS

| 4,800,554 | 1/1989 | Yamasaki et al. | 360/92 X |
| 4,899,326 | 2/1990 | Takeya et al. | 369/33 X |
| 4,918,676 | 4/1990 | Miyasaka | 369/33 X |
| 4,926,404 | 5/1990 | Kimura et al. | 369/33 X |

FOREIGN PATENT DOCUMENTS 63-98893  4/1988 Japan .
1-251467 10/1989 Japan .

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

Table of contents (TOC) information is read before a plurality of recording mediums, such as compact disks, each having recorded information to be reproduced and TOC information, with respect to the recorded information are played back. Playback operation of the recording mediums is controlled based on the read TOC information. Programmed information which indicates a sequence according to which the recorded information of the recorded mediums is to be reproduced is read from a programmed information memory based on the result of checking of the recording mediums. The playback operation of the recording medium is controlled by a playback control unit based on the programmed information thus read. The playback operation can immediately be controlled based on the stored programmed information. If there is new programmed information relative to the recording mediums, the playback operation of the recording mediums can be controlled according to the new programmed information by employing only the stored TOC information. Therefore, even when new programmed information is established, the playback operation can quickly be controlled.

3 Claims, 14 Drawing Sheets

FIG. 4

| Size | Field | Area |
|---|---|---|
| 1 BYTE | 2ND RAM CONDITION CHECKING FLAG | CONDITION CHECKING DATA AREA |
| 1 BYTE | TOC DATA READING CONDITION CHECKING FLAG | |
| 8 BYTES | FTNO (STARTING MUSIC NUMBER)<br>FTNO (LAST MUSIC NUMBER)<br>LMIN (LAST MUSIC ENDING MINUTE)<br>LSEC (LAST MUSIC ENDING SECOND)<br>LFRAME (LAST MUSIC ENDING FRAME)<br>MUSIC STARTING ABSOLUTE TIME FOR FTNO<br>MUSIC STARTING ABSOLUTE FOR FTNO+1<br>MUSIC STARTING ABSOLUTE FRAME FOR FTNO+1 | MAGAZINE IDENTIFICATION DATA AREA |
| 6 BYTE | OUTPUT LEVEL REGISTERING AREA (FOR 6 DISKS) | |
| 288 BYTE | TOC INFORMATION REGISTERING AREA (FOR 6 DISKS×21 MUSIC PIECES) | |
| 80 BYTE | PROGRAM AREA 9 | |

(TOTAL 384 BYTES)

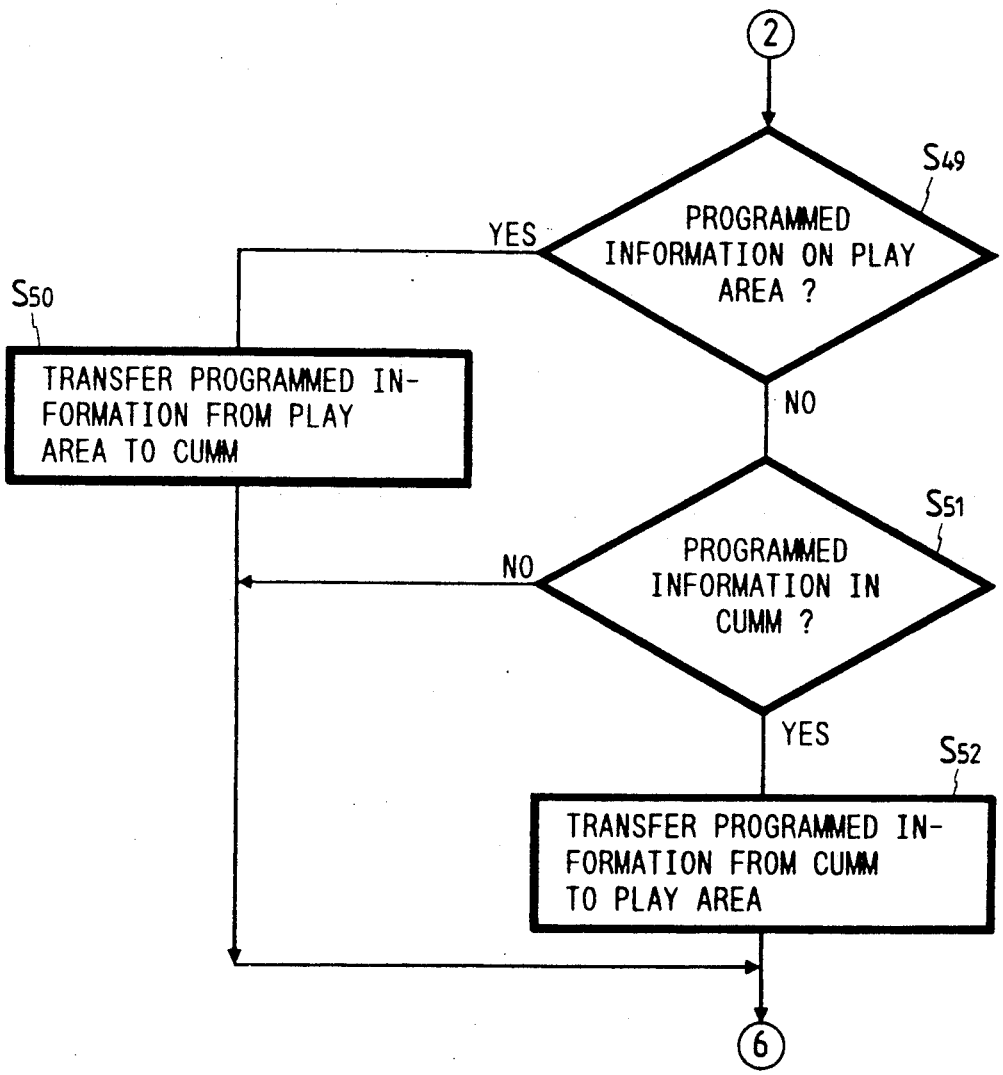

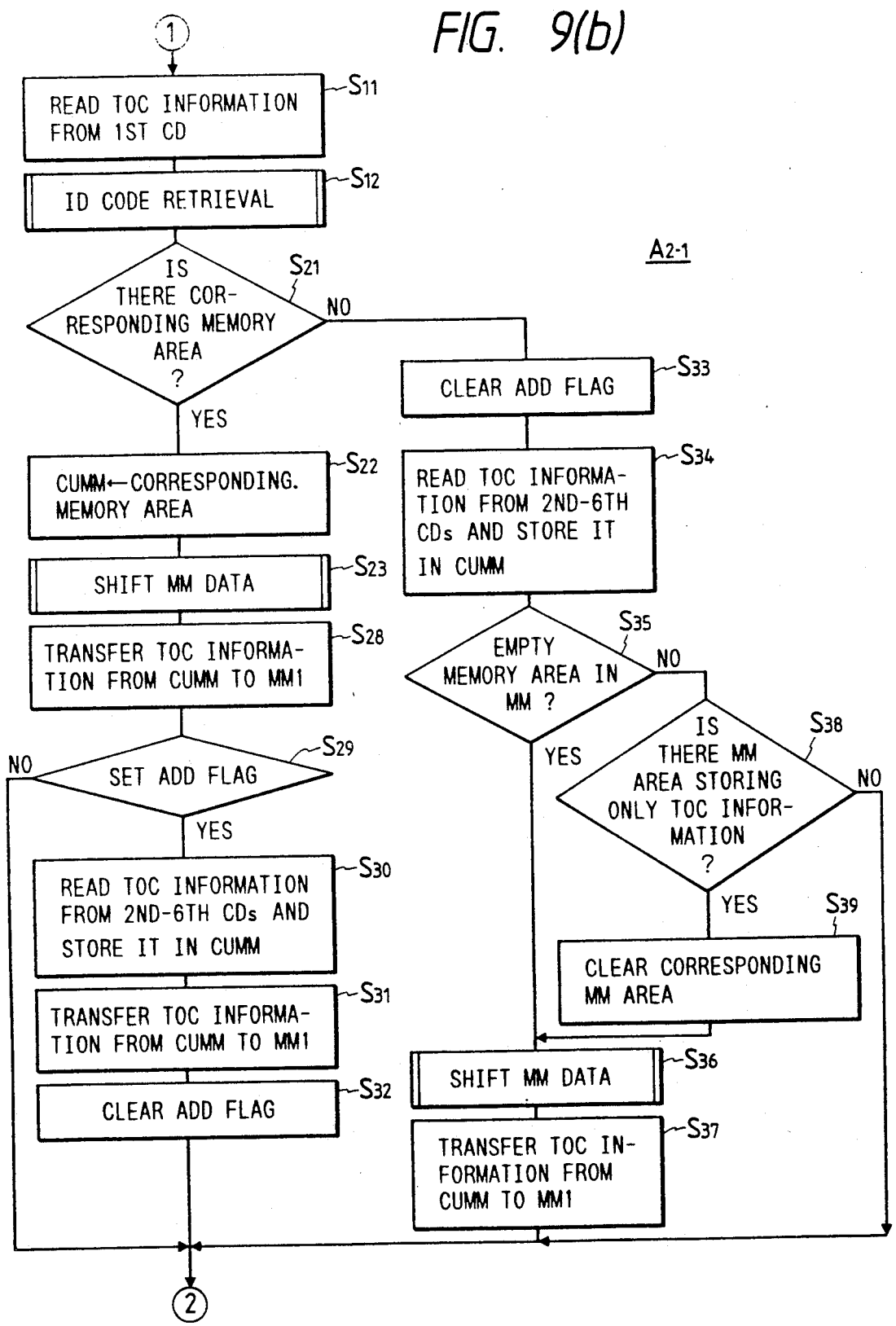

INFORMATION REPRODUCING SYSTEM AND METHOD

BACKGROUND OF THE INVENTION

1. Field of the Invention

The present invention relates to an information reproducing system, and more particularly to an information reproducing system which can play back successively a plurality of recording mediums such as CDs (Compact Disks), LVDs (Laser Vision Disks), or the like.

2. Prior Art

There are known CD players for reproducing information which is recorded on CDs. A CD player operates to optically read information recorded on a CD which is rotating thereby to reproduce the information under the control of a playback control unit. Before the playback operation is started by such an information reproducing system, TOC (Table of Contents) information, which is recorded as control data on a CD together with information to be reproduced, is read from the CD into a RAM in the playback control unit. The playback operation is controlled on the basis of the TOC information which is thus read. The TOC information contains various inherent data relative to the information recorded on the CD, such as the number of music pieces recorded on the CD, and the periods of time of the music pieces, for example.

Heretofore, TOC information is read from a CD into the playback control unit each time such a CD is loaded in the CD player. When the playback of a CD is completed and a next CD is loaded in the CD player, the TOC information from the CD that has been played back is no longer held by the playback control unit, and TOC information is newly read from the next CD into the playback control unit.

Recently, there has been developed a multidisk CD player in which a plurality of CDs are stored in a single magazine (a group of recording mediums) and such a magazine is loaded and played back, so that the plural CDs can be handled for easy playback. The multidisk CD player has an automatic CD changer which automatically selects and plays back desired CDs successively.

One conventional multidisk CD player will be described below.

A multidisk CD player employs a magazine which stores a purality of CDs. The multidisk CD player has an automatic CD changer for automatically selecting a desired CD, a drive unit for rotating a selected CD, a pickup for optically reading information recorded on the CD, a signal processor for converting the read information into a analog signal, a display/operation panel for displaying a playback condition and operating the CD player for playback, and a playback control unit (playback control means) for controlling the entire playback operation of the CD player. Such a multidisk CD player also reads TOC information from each of the CDs which are stored in the magazine.

The multidisk CD player can play back a plurality of CDs successively, and can operate according to programmed information which represents the sequence according to which stored CDs are to be played back, the sequence according to which recorded music pieces are to be played back, and other playback modes. Such programmed information is manually established by the user of the CD player when the magazine is loaded. The programmed information is written in a RAM in the playback control unit when the magazine is loaded into the CD player. The programmed information is treated in the same manner as the TOC information. More specifically, programmed information is established with respect to each magazine. When a magazine is replaced with another magazine, the programmed information which has been established with respect to the previous magazine and read into the playback control unit is erased, and programmed information with respect to the newly loaded magazine has to be esablished and read again even if such programmed information is the same as the programmed information regarding the previous magazine.

One problem of the conventional multidisk CD player is therefore that programmed information which has been established and read with respect to a magazine is erased each time the magazine is replaced with another magazine. This requires the user to establish programmed information each time a new magazine is loaded into the CD player, but such a procedure is complex to perform. Any programmed information which has been read into the playback control unit is also erased when the power supply of the CD player is turned off, and hence has to be established again when the power supply is turned on again. If programmed information which has been established with respect to a certain magazine is stored and used again, then the user is not required to follow the above complex procedure.

However, the user may sometimes want to play back the same magazine according to different programmed information. In such a case, no quick playback control can be achieved if the TOC information of the magazine group of recorded mediums is read again.

SUMMARY OF THE INVENTION

In view of the aforesaid problems of the conventional information reproducing system, it is an object of the present invention to provide an information reproducing system which uses again either stored programmed information or TOC information with respect to a group of loaded recording mediums, so that the recording mediums which are loaded can successively be played back quickly and smoothly.

According to the present invention, there is provided an information reproducing system for playing back a group of recording mediums each having recorded information to be reproduced and TOC information with respect to the recorded information, said information reproducing system comprising:

means for reading the TOC information of the recording mediums before the recorded information is reproduced;

information storing means for storing the TOC information and programmed information which indicates a sequence according to which the recorded information of the recording mediums is to be reproduced;

recording medium group checking means for determining the group of recording mediums based on the TOC information;

program reading means for reading the programmed information from said information storing means based on the result of determination by said recording medium group checking means; and playback control means for controlling playback operation of the recording medium based on the read programmed information, said playback control means comprising programmed information checking means for determining whether there is new programmed information relative to the recording mediums, and, if there is new programmed information, for controlling the playback operation of the recording mediums based on the new programmed information.

With the above arrangement, a group of loaded recording mediums are determined by the recording medium group checking means based on TOC information relative to the recording mediums, programmed information established with respect to the recording mediums is read from the programmed information storing means by the program reading means based on the result of determination by the recording medium group checking means, and playback operation of the recording mediums is controlled by the playback control means based on the programmed information which has thus been read. If programmed information with respect to the loaded recording mediums has been stored, then it is not necessary to read in TOC information and establish programmed information. Therefore, the playback operation can immediately be controlled based on the stored programmed information.

The playback control means has the programmed information checking means which determines whether there is new programmed information relative to the group of recording mediums. If there is such new programmed information, the playback operation of the recording mediums can be controlled according to the new programmed information by employing only the stored TOC information. Therefore, even when new programmed information is established, the playback operation can quickly be controlled.

The above and other objects, features and advantages of the present intention will become more apparent from the following description when taken in conjunction with the accompanying drawings in which preferred embodiments of the present invention are shown by way of illustrative examples.

BRIEF DESCRIPTION OF THE DRAWINGS

FIG. 4 is a detailed block diagram of a current magazine memory area in one of the RAMs;

FIGS. 6(a) to (d) are detailed flowcharts of the playback control sequence, respectively;

FIGS. 9(a) to 9(d) are detailed flowcharts of a playback control sequence of an information reproducing system according to another embodiment of the present invention, respectively.

DETAILED DESCRIPTION OF THE PREFERRED EMBODIMENTS

Figure 1A:
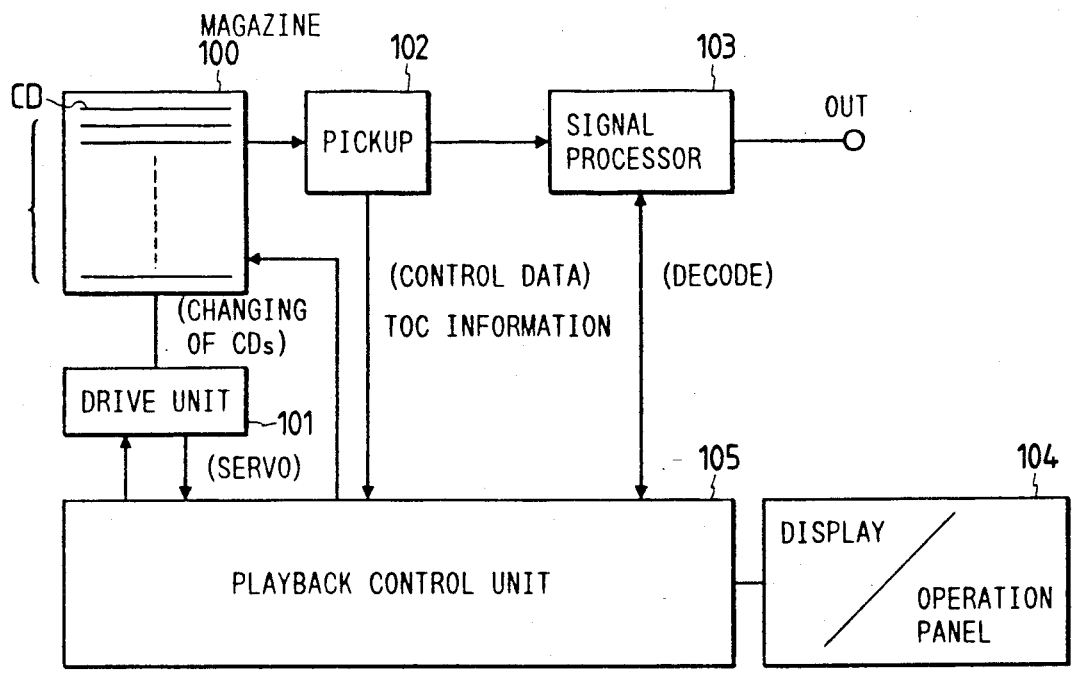
FIG. 1(a) is a block diagram of an information reproducing system according to an embodiment of the present invention.

The present invention is particularly useful when embodied in an information reproducing system such as a multidisk CD player as shown in FIG. 1(a).

The multidisk CD player employs a magazine 100 which stores a plurality of recording mediums of CDs (typically 6 CDs). The multidisk CD player comprises an automatic CD changer for automatically selecting a desired CD in the magazine 100, a drive unit 101 for rotating a selected CD, a pickup 102 for optically reading information recorded on the CD, a signal processor 103 for converting the read information into an analog signal, a display/operation panel 104 for displaying a playback condition and operating the CD player for playback, and a playback control unit (playback control means) 105 for controlling the entire playback operation of the CD player.

Figure 1B:
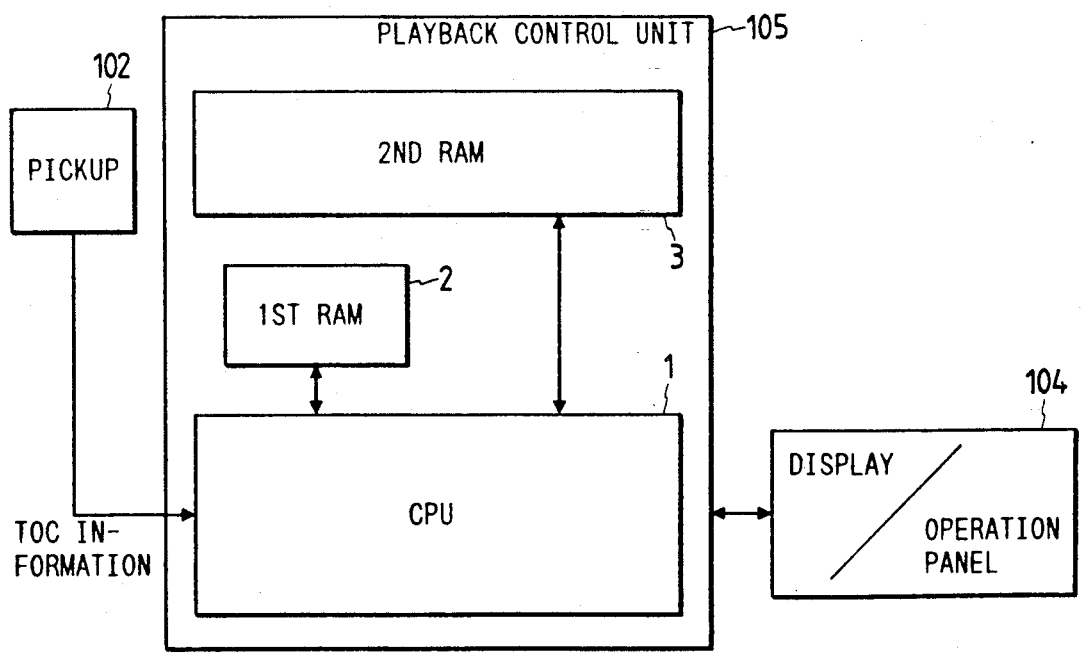
FIG. 1(b) is a detailed block diagram of a playback control unit in the information reproducing system.

As shown in FIG. 1(b), the playback control unit 105 comprises a central processing unit (hereinafter referred to as a "CPU") 1 for controlling the playback operation of the CD player, a first RAM 2 for storing various control data, and a second RAM 3 having a plurality of storage areas for storing various control data.

Figure 2:
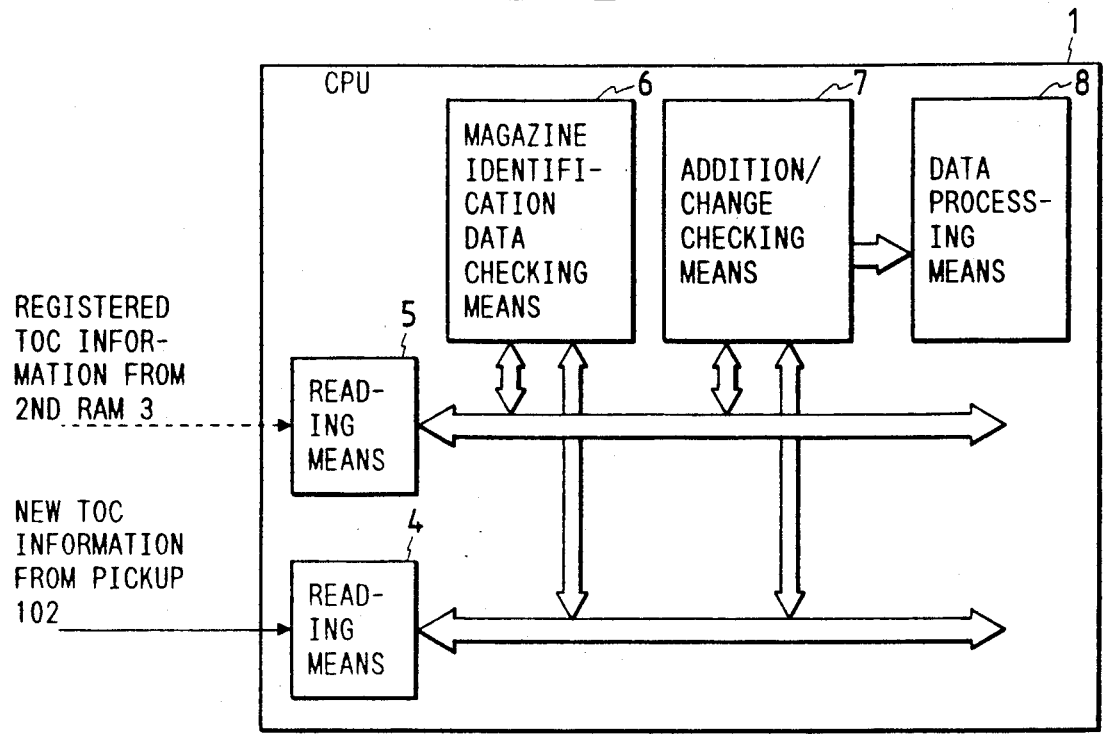
FIG. 2 is a detailed block diagram of a CPU in the playback control unit.

As shown in FIG. 2, the CPU 1 comprises a reading means 4 for reading new TOC information from the pickup 102, a reading means 5 for reading registered TOC information from the second RAM 3, a magazine identification data checking means 6 for determining whether the new TOC information of the CDs in the loaded magazine 100 is the same as that of the registered TOC information, an addition/change checking means 7 for determining whether the CDs in the loaded magazine 100 include a CD added to or changed in a magazine which has the registered TOC information, and a data processing means 8 for processing data as required by the added or changed CD based on the result of a check made by the addition/change checking means 7. These means 4, 5, 6, 7 and 8 are implemented by a control program which is stored in a ROM (not shown) in the CPU 1.

Figure 3:
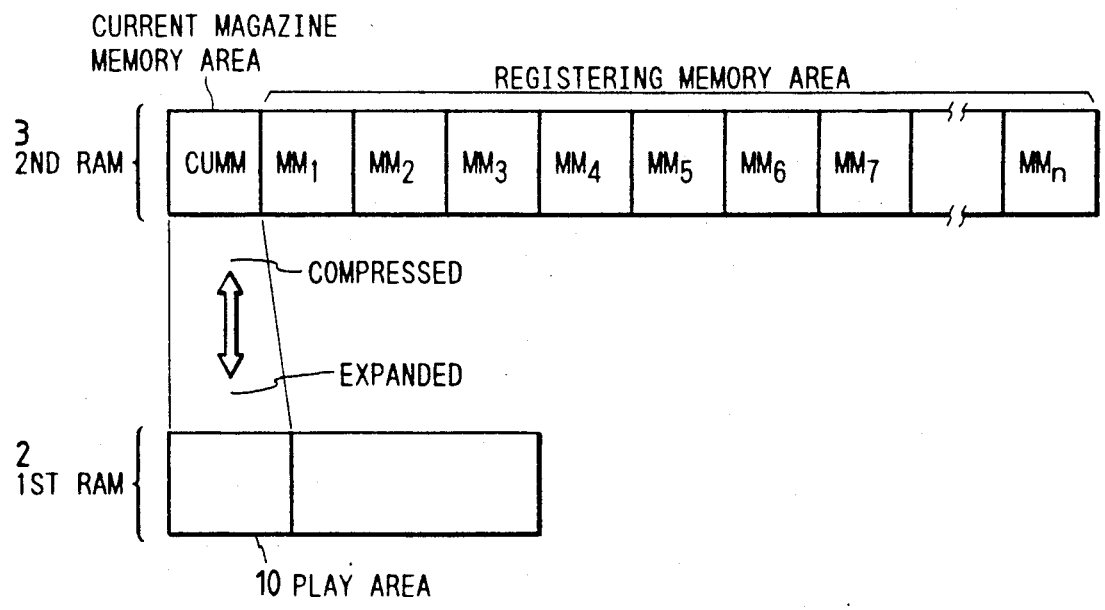
FIG. 3 is a detailed block diagram of RAMs in the playback control unit.

The first RAM 2 and the second RAM 3 are shown in detail in FIG. 3.

As shown in FIG. 3, the second RAM 3 includes a current magazine memory area CUMM for storing playback control information (described later) which is being presently selected or automatically selected, and n registering memory area MM1 through MMn each having the same structure as that of the current magazine memory area CUMM. The suffixes 1 through n of the designations MM1 through MMn for the registering memory areas represent pointer numbers of these registering memory areas.

The first RAM 2 has a play area 10 which has a storage capacity that is the same as or graeter than the storage capacity of the current magazine memory area CUMM.

Information of the current magazine memory area CUMM is stored in a compressed state while information of the play area 10 is stored in an expanded state. The informations of two areas CUMM and 10 are transferred relative to each other.

It is assumed that each of the registering memory areas MM1 through MMn records only item of the same magazine identification data ID, and that TOC information and programmed information will collectively be referred to as "playback control information".

The current magazine memory area CUMM is shown in greater detail in FIG. 4. In view of limited memory storage capacity and increased operation speed, a portion of TOC information with respect to an uppermost CD stored in the magazine 100 is employed as the magazine identification data ID.

As illustrated in FIG. 4, the current magazine memory area CUMM has an overall storage capacity of 384 bytes, for example. Of these 384 bytes, the first 2 bytes are assigned to a condition checking data area for the CPU 1 to effect a condition checking process, the next 8 bytes to a magazine identification data ID area, the next 6 bytes to an output level registering area for each of six CDs as it is played back, the next 288 bytes to a TOC information registering area for the CDs, and final 80 bytes to a program area 9.

In the first 2 bytes, 1 byte is assigned to a second RAM condition checking flag, and another byte is assigned to a TOC data reading checking flag. Each flag will be explained after.

The magazine identification data ID area stores data of a starting music number FTNO, a last music number ETNO, a last music ending minute LMIN, a last music ending second LSEC, a last music ending frame LERAME, a music starting absolute frame for a music piece corresponding to ETNO, a music starting absolute minute for a music piece corresponding to (FTNO +1), and a music starting absolute frame for the music piece corresponding to (FTNO +1). Each item of these date is stored as one byte.

Each of the last music ending minute LMIN, the last music ending second LSEC, and the last music ending frame LFRAME is represented in absolute time.

The above TOC information is used as the magazine identification data ID because the TOC information is inherent in the CD to which it belongs, and when certain pieces to TOC information with respect to CDs are compared with each other, the CD and hence the magazine which contains the CD can be identified. The use of the TOC information for magazine identification is significant for the above reason.

The playback control sequence of the playback control unit 105 will now be described below.

Figure 5:
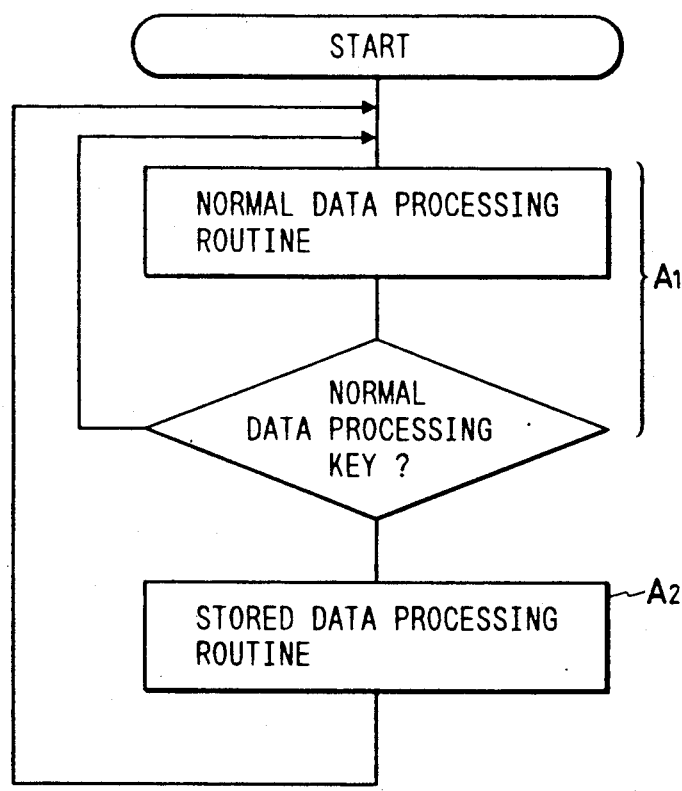
FIG. 5 is a schematic flowchart of a playback control sequence.

FIG. 5 schematically shows a flowchart of the playback control sequence.

In a normal data processing routine A1, various data of normal playback operation of the multidisk CD player are displayed, and input data entered from an operation key are processed (normal data processing). The normal data processing routine A1 periodically determines whether there is a data entry from an operation key or not, and executes the processing of the data entered from the operation key in overriding relation to other processing.

If there is not a data entry from the operation key, the playback control unit automatically executes the playback control sequence according to a stored data processing routine A2.

The normal data processing routine A1 and the stored data processing routine A2 are shown in detail in FIG. 6.

Figure 6A:
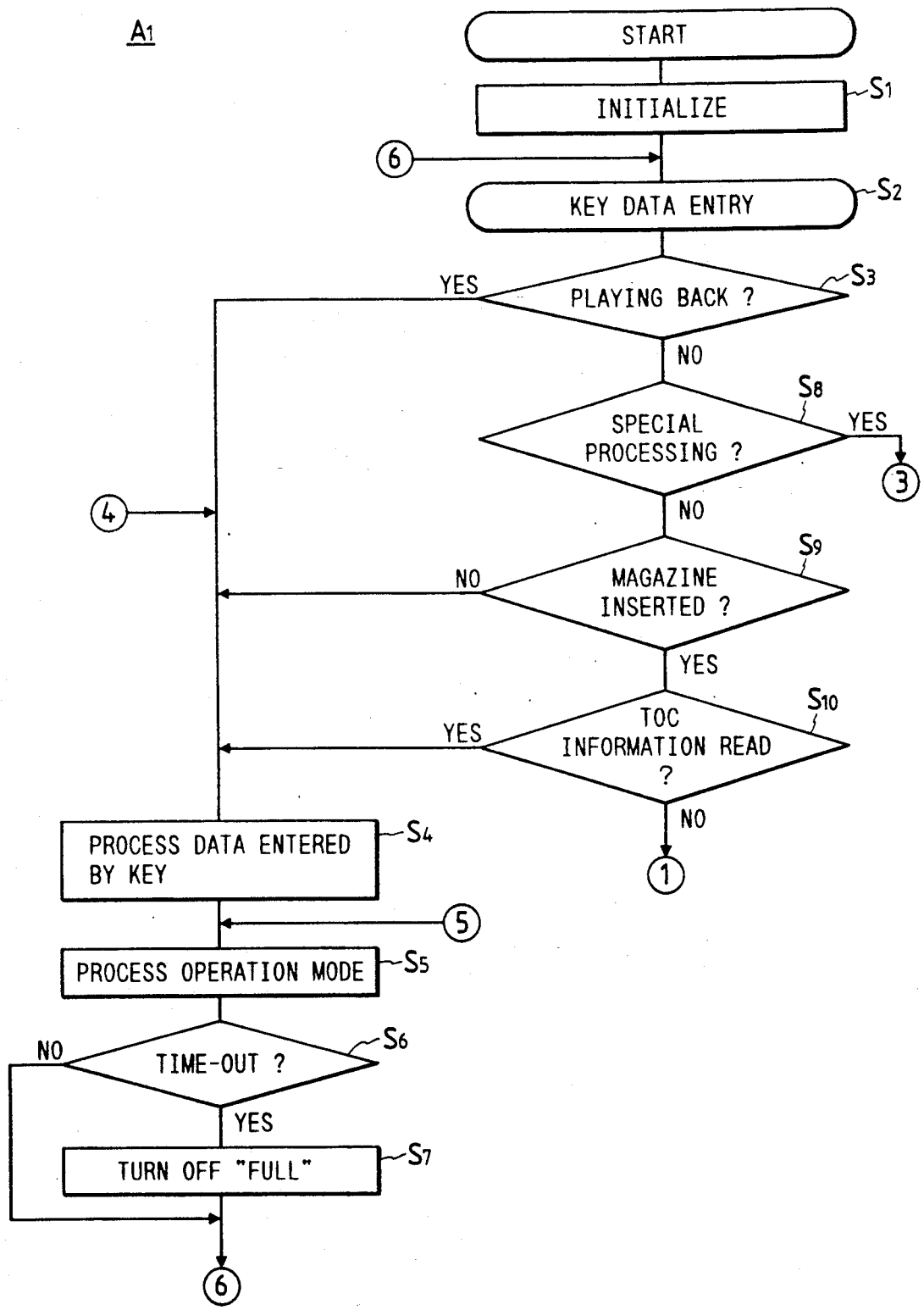

NORMAL DATA PROCESSING ROUTINE A1 (FIG. 6a)

The playback control unit 105 is initialized in a step S1 so that it is ready for playback operation.

Then, data are entered through operation keys in a step S2.

If the CD player is playing back a CD when the key data entry is made, then the CPU 1 processes the entered data in steps S3, S4, and processes operation modes in a step S5. Then, the CPU 1 determines whether the count of a timer indicates a time-out in a step S6. If no time-out occurs, then control goes back to the step S2. In the case of this routine A1, the timer is not operated, and therefore normally no time-out occurs.

Figure 6B:
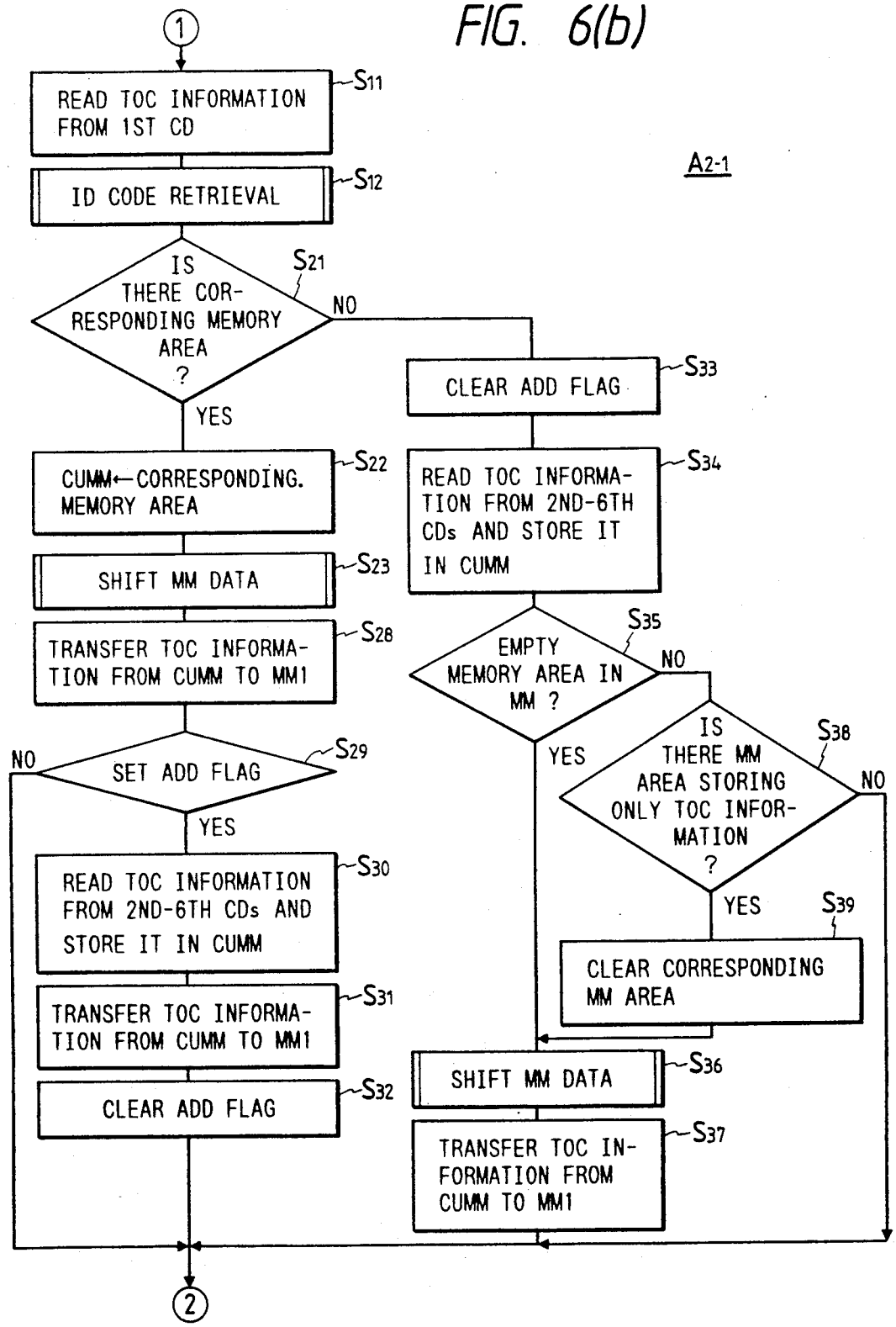
Figure 6C:
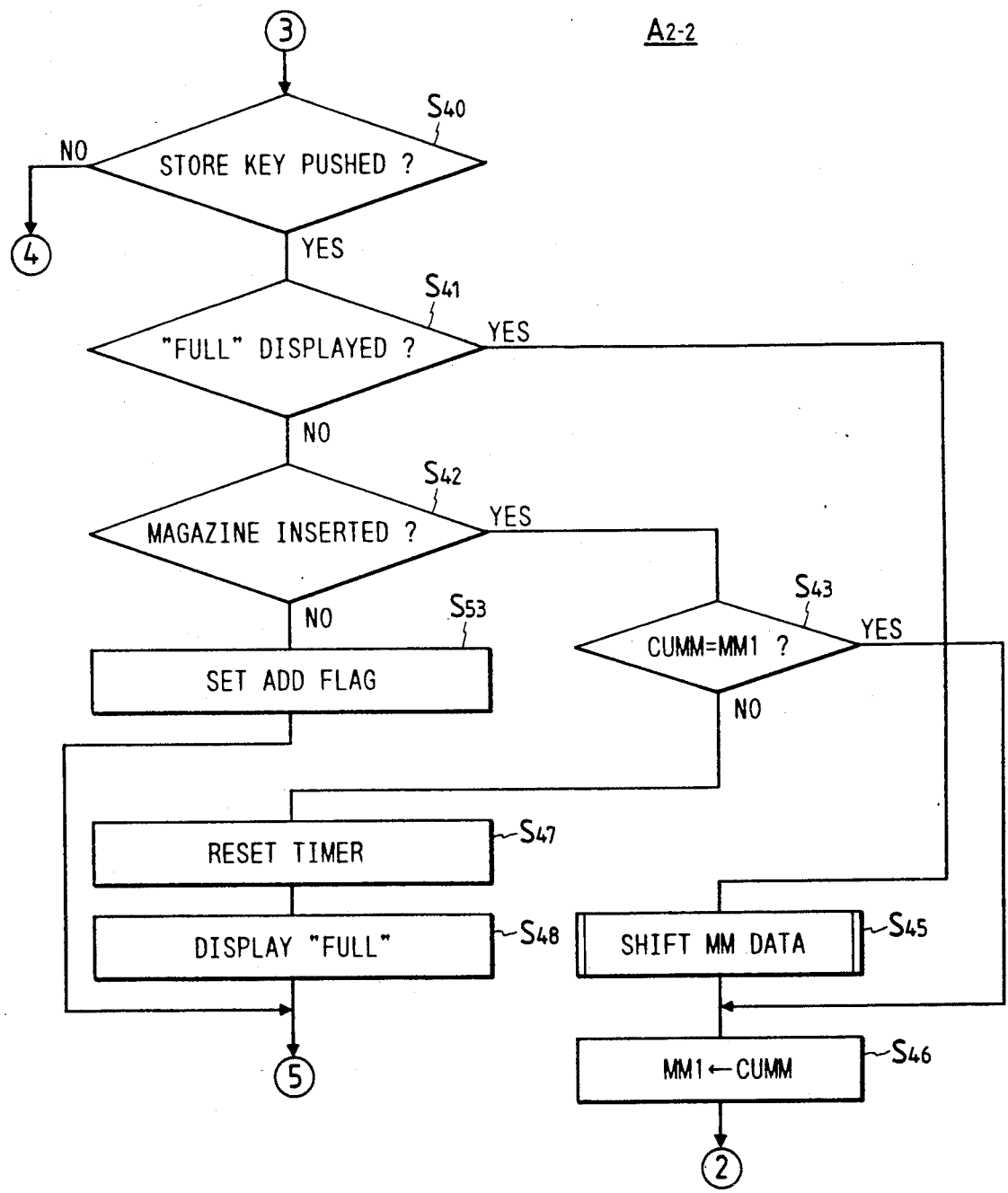

If the CD player is not playing back a CD when the key data entry is made, then CPU 1 determines whether a special processing is required or not in a step S8. If a special processing is required, then control goes to a special processing routine A2-2 (FIG. 6c) which is part of the stored data processing routine A2 (FIGS. 6b, 6c and 6d).

If no special processing is required, then the CPU 1 determines whether a magazine has been inserted in the CD player or not.

If in a step 9a, a magazine has not been inserted, then the entered data are processed in the step S4, and operation modes are processed in the step S5. Then, in the step S6, the CPU 1 determines whether the timer count indicates a time-out, and control returns to the step S2 if no time-out occurs.

If a magazine has been inserted in the step S9, control goes to a step S10 in which the CPU 1 determines whether TOC information of each of the CDs in the magazine 100 has been already read or not. If already read, then the steps S4, S5 and S6 are executed, and control goes back to the step S2 if no time-out occurs.

The above steps are repeated to carry out the normal data processing routine A1.

STORED DATA PROCESSING ROUTINE A2 (FIGS. 6b, 6c AND 6d)

The stored data processing routine A2 is composed of an automatic processing routine A2-1 (FIG. 6b) a special processing routine A2-2 (FIG. 6c) (referred to as above), and a program area processing routine A2-3 (FIG. 6d). The automatic processing routine A2-1 automatically processes data, according to a sequence (described below), required when the magazine 100 is replaced, irrespective of key data entries made by a user of the CD player. The special processing routine A2-2 semiautomatically processes data, according to a sequence (described later on), required when the magazine 100 is replaced, in response to special key operation (different from normal key operation) effected by the user of the CD player. These routines A2-1, A2-2, A2-3 will successively be described below.

AUTOMATIC PROCESSING ROUTINE A2-1 (FIG. 6b)

If TOC information of each of the CDs has not yet been read in the step S10, then control proceeds from the normal data processing routine A1 to the automatic processing routine A2-1.

In the automatic processing routine A2-1, the TOC information of the uppermost CD in the magazine 100 is read in a step S11.

Figure 7:
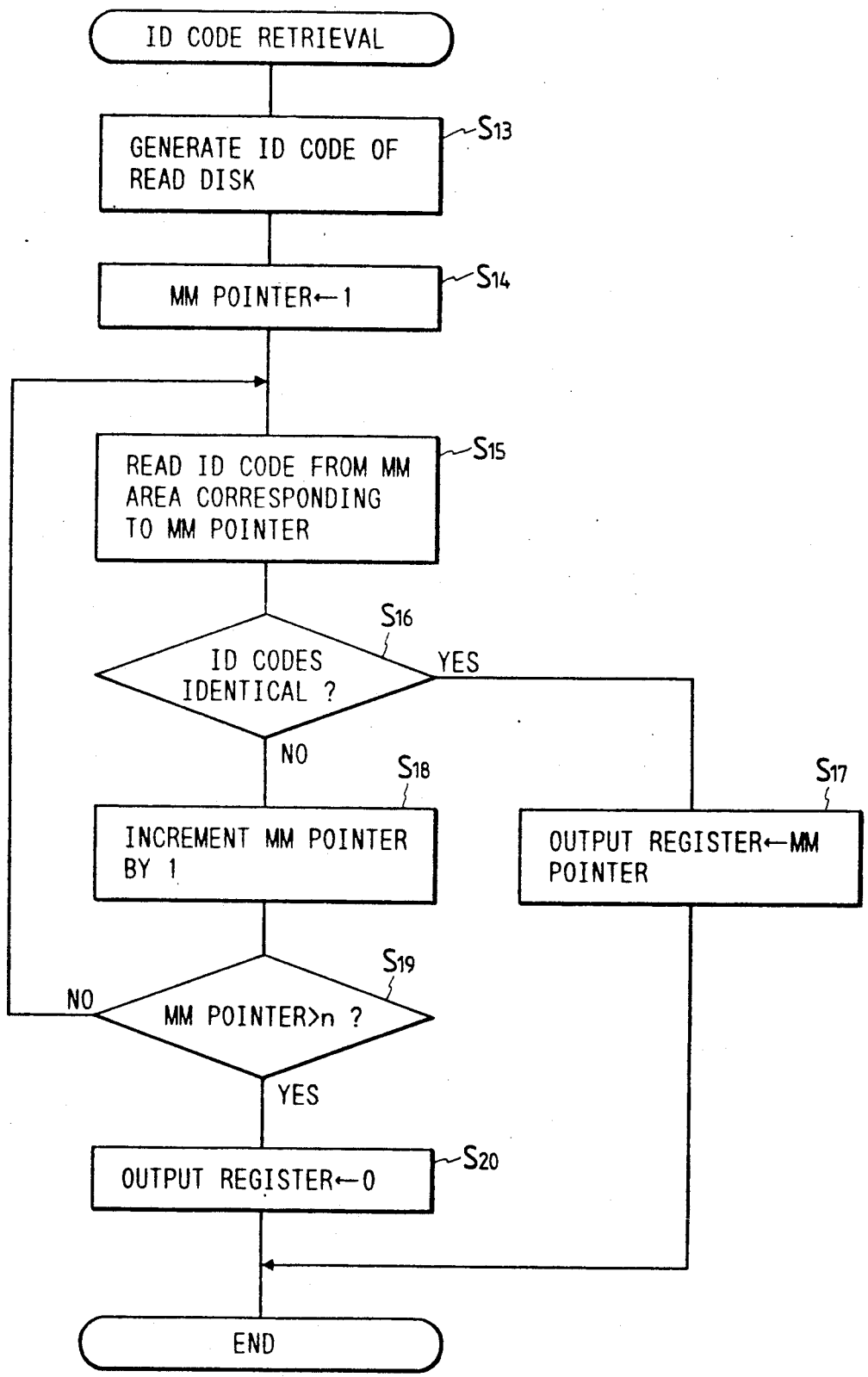
FIG. 7 is a flowchart of an ID retrieval routine.

Then, the magazine identification data ID (identification code) is retrieved in a step S12 according to an ID retrieval routine shown in FIG. 7.

In the ID retrieval routine, of the TOC information which has been read in the step S11, the data of the starting music number FTNO, the last music number ETNO, the last music ending minute LMIN, the last music ending second LSEC, the last music ending frame LFRAME, the music starting absolute frame for a music piece corresponding to FTNO, the music starting absolute minute for a music piece corresponding to (FTNO+1), and the music starting absolute frame for the music piece corresponding to (FTNO+1), are read into the magazine identification data area in the current magazine memory area CUMM, thereby generating magazine identification data ID in a step S13.

Then, the pointer number of a registering memory area is set to 1 in a step S14.

The magazine identification data ID stored in the magazine identification data area in the registering memory area MM1 which corresponds to the pointer number 1 are read in a step S15, and compared with the magazine identification data ID stored in the magazine identification data area in the current magazine memory area CUMM in a step S16.

If the compared data are identical to each other, then the pointer number is output to the condition checking data area in the current magazine memory area CUMM in a step S17, and then the ID retrieval routine is brought to an end.

If the compared data are not identical to each other, then the pointer number is incremented by 1 in a step S18. If the pointer number is found to be smaller than n in a next step S19, then the data in the magazine identification data area in the registering memory area which corresponds to the incremented pointer number are read in the step S15, and compared with the magazine identification data ID in the current magazine memory area CUMM in the step S16. The above process (ranging from the step S15 to the step S19) is repeated until the pointer number becomes greater than n. The pointer number at which the data in the magazine identification data area in the registering memory area are identical to the data in the magazine identification data area in the current magazine memory area CUMM, is output to the condition checking data area in the current magazine memory area CUMM in the step S17, after which the ID retrieval routine is ended.

If no identical data are obtained even when the pointer number exceeds n, then since the data written in the current magazine memory area CUMM are new, "0" is output to the condition checking data area in the current magazine memory area CUMM in a step S20, and the ID retrieval routine is finished.

Referring back to FIG. 6b, the CPU 1 determines whether the data in the condition checking data area in the current magazine memory area CUMM are "0" or not in a step S21. If not "0", all data in the registering memory area corresponding to the pointer number are transferred to the current magazine memory area CUMM in a step S22.

Then, control proceeds to a registering memory shift routine (shown in FIG. 8) in a step S23.

Figure 8:
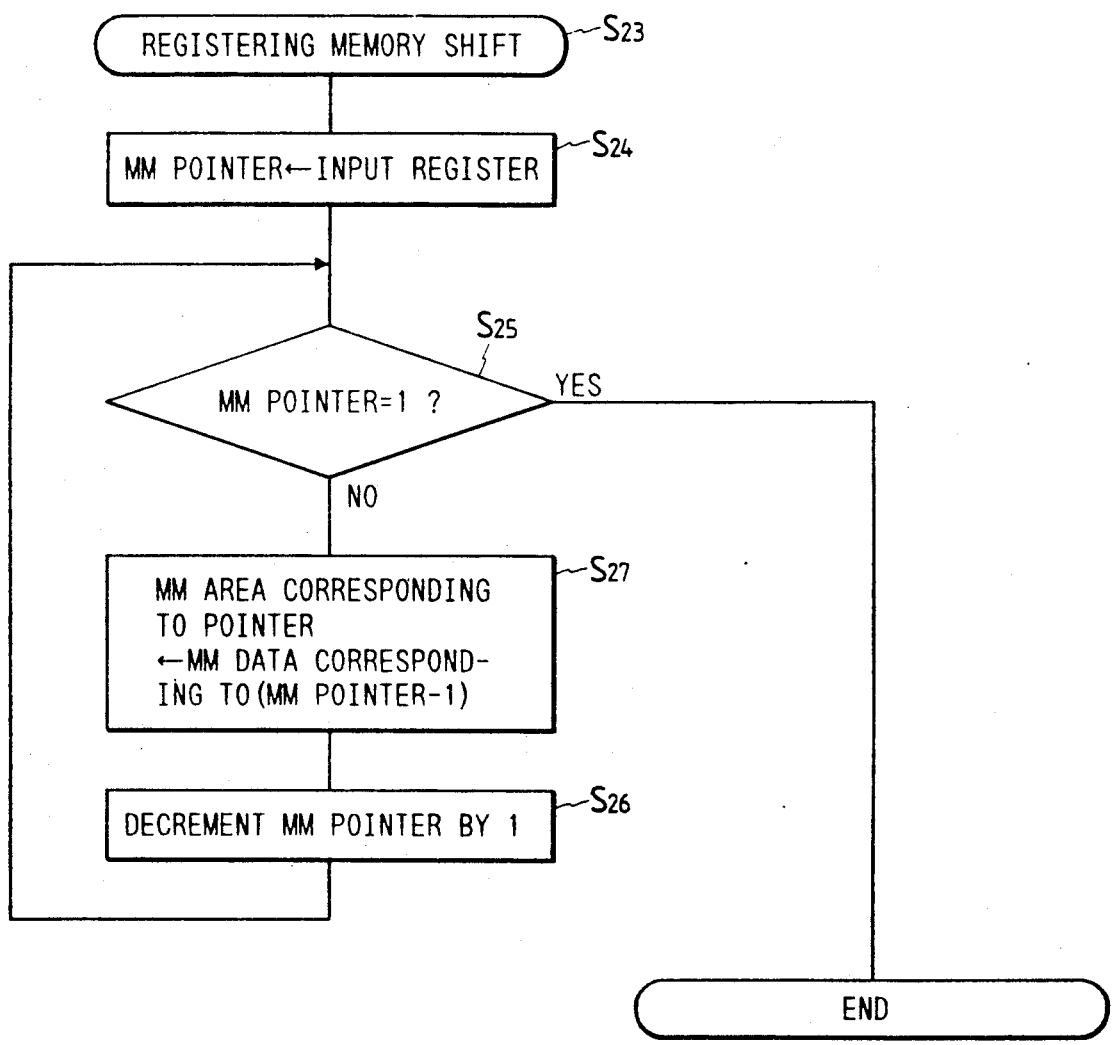
FIG. 8 is a flowchart of a registering memory shift routine.

As shown in FIG. 8, the pointer number of the registering memory area is read from the condition checking data area in the current magazine memory area CUMM in a step S24, which is followed by a step S25 in which the CPU 1 determines whether the pointer number is 1 or not.

If the pointer number is 1, then the registering memory shift routine is ended, and control goes to a step S28 (FIG. 6b), mentioned after.

If the pointer number is not 1, then the data stored in the registering memory area MM which has a pointer number corresponding to (the pointer number −1) are transferred to the registering memory area of the pointer number in a step S26.

Then, the pointer number is decremented by 1 in a step S27. The steps S25 through S27 are repeated by successively shifting the data through the registering memory areas until the pointer number of the registering memory area from which the data are transferred becomes 1. Thereafter, control goes to the step S28.

In the step S28 shown in FIG. 6b, all pieces of TOC information in the current magazine memory area CUMM are transferred to the registering memory area MM1. Now, the same data are stored in the current magazine memory area CUMM and the registering memory area MM1.

Then, the CPU 1 determines whether an add flag is set or not in step S29.

If an add flag is set, then an addition/change processing routine is executed since there is a data to be added or changed.

In the addition/change processing routine, the CPU 1 reads TOC information relative to all CDs except the uppermost CD in the magazine, i.e., the second through sixth CDs, and writes the read TOC information into the TOC information registering area in the current magazine memory area CUMM in a step S30.

The CPU 1 then transfers all data or added data in the current magazine memory area CUMM to the registering memory area MM1 in a step S31. In this manner, any added or changed data are recorded in the registering memory area MM1.

Thereafter, the CPU 1 clears the add flag in a step S32, from which control goes to the program area processing routine A2-3 (FIG. 6d). If no add flag is set, i.e., any add flag is cleared, in the step S29, then control goes from the step S29 directly to the program area processing routine A2-3.

If "0" is written in the condition checking data area in the current magazine memory area CUMM in the step S21, since the data written in the current magazine memory area CUMM are new, the automatic processing routine A2-1 (FIG. 6b) still remains to be executed.

The CPU 1 clears the add flag in a step S33, and reads TOC information relative to all CDs except the uppermost CD in the magazine and writes the read TOC information into the TOC information registering area in the current magazine memory area CUMM in a step S34.

Then, the CPU 1 determines whether there are any empty areas in the registering memory areas in a step S35.

If there are any empty areas, then the pointer number of the empty area which is the smallest is written in the condition checking data area in the current magazine memory area CUMM (FIG. 4). Control then goes to the registering memory shift routine (FIG. 8) in a step S36.

In the registering memory shift routine, the pointer number of the registering memory area is read from the condition checking data area in the current magazine memory area CUMM (step S24), and it is determined whether the pointer number is 1 or not in the step S25.

If the pointer number is 1, then the registering memory shift routine is ended since no data are registered.

If the pointer number is not 1, then the data stored in the registering memory area MM which has a pointer number corresponding to (the pointer number−1) are transferred to the registering memory area of the pointer number (step S26). Then, the pointer number is decremented by 1 (step S27). The steps S25 through S27 are repeated by successively shifting the data through the registering memory areas until the pointer number of the registering memory area from which the data are transferred becomes 1. Thereafter, the registering memory shift routine is finished.

When the pointer number becomes 1, the CPU 1 transfers the TOC information from the current magazine memory area CUMM to the registering memory area MM1 in a step S37 (FIG. 6b), from which control goes to the program area processing routine A2-3 (FIG. 6d).

If there is no empty area, the CPU 1 determines whether there is a registering memory area which stores only TOC information (i.e., a registering memory area with no program playback control information written in a program area) in a step S38.

If there is a registering memory area which stores only TOC information, then the CPU 1 clears that the registering memory area in a step S39 with the writing of the pointer number in the condition checking data area in the current magazine memory area CUMM, and then control goes to the registering memory shift routine in the step S36.

In the registering memory shift routine shown in FIG. 8, the CPU 1 reads the pointer number of the registering memory area from the condition checking data area in the current magazine memory area CUMM (step S24), and determines whether the pointer number is 1 or not in the step S25.

If the pointer number is 1, then the registering memory shift routine is ended since no data are registered in the registering memory area MM1, and control proceeds to the step S37 (FIG. 6b).

If the pointer number is not 1, then the data stored in the registering memory area which has a pointer number corresponding to (the pointer number—1) are transferred to the registering memory area of the pointer number (step S26). Then, the pointer number is decremented by 1 (step S27). The steps S25 through S27 are repeated by sucessively shifting the data through the registering memory areas until the pointer number of the registering memory area from which the data are transferred becomes 1. Thereafter, the registering memory shift routine is finished.

When the pointer number becomes 1, the CPU 1 transfers the TOC information from the current magazine memory area CUMM to the registering memory area MM1 in the step S37, from which control goes to the program area processing routine A2-3 (FIG. 6d).

If there is no registering memory area which stores only TOC information in the step S38, control goes directly to the program area processing routine A2-3 (FIG. 6d).

SPECIAL PROCESSING ROUTINE A2-2 (FIG. 6c)

If the CPU 1 determines that special processing is required, it determines whether a STORE key is pushed or not in a step S40 (FIG. 6c). If the STORE key is not pushed, control goes back to the normal data processing routine A1.

If the STORE key is pushed, then the CPU 1 determines whether the message "FULL" is displayed or not in a step S41.

If the message "FULL" is displayed, then control goes to the registering memory shift routine in which the data are shifted through the registering memory areas in a step S45, at that time, the oldest data are erased from the registering memory area MMn and the data are transferred from the current magazine memory area CUMM to the registering memory area MM1 in a step S46. Then, control goes to the program area processing routine A2-3.

If the message "FULL" is not displayed, then the CPU 1 determines whether a magazine is loaded or not in the CD player in a step S42.

If no magazine is loaded in the CD player, then the CPU 1 sets the add flag in a step S53, and control goes back to the normal data processing routine A1.

If a magazine is loaded in the CD player, then the CPU 1 determines whether the data stored in the current magazine memory area CUMM and the data stored in the registering memory area MM1 are equal to each other or not in a step S43.

If the data stored in the current magazine memory area CUMM and the data stored in the registering memory area MM1 are equal to each other, then the CPU 1 transfers the data from the current magazine memory area CUMM to the registering memory area MM1 in a step S46. Thereafter, control goes to the program area processing routine A2-3 (FIG. 6d).

If the data stored in the current magazine memory area CUMM and the data stored in the registering memory area MM1 are not equal to each other, then the CPU 1 resets the timer in a step S47 because all the registering memory areas are full, displays the message "FULL" in a step S48, and then control returns to the normal data processing routine A1 (FIG. 6a).

Thereafter, the CPU 1 determines whether the count of the indicates a time-out (step S6). If a time-out occurs, then the CPU 1 turns off the display of the message "FULL" in a step S7, from which control repeats the normal data processing routine A1.

If the STORE key is depressed before a time-out occurs in the step S40, then since the STORE key is pushed during the display of the message "FULL", control goes to the registering memory shift routine in the step S45. The oldest data which have been stored in the registering memory area MMn are erased because the data are transferred from the registering memory area MM(n−1) to the registering memory area MMn. The data in the current magazine memory area CUMM are transferred to the registering area MM1 in the step S46, after which control goes to the program area processing routine A2-3 (FIG. 6d).

Program Area Processing Routine A2-3 (FIG. 6d).

The program area processing routine A2-3 is a routine according to the present invention.

The CPU 1 first determines whether new programmed information is stored or not in the play area 10 of the first RAM 2 in a step S49.

If new programmed information is stored in the play area 10, the CPU 1 transfers the programmed information from the play area 10 to the program area 9 in the current magazine memory area CUMM to replace old programmed information of the program area 9 with the transferred new programmed information or to record the new programmed information in the program area 9, in a step S50, and then control goes to the normal data processing routine A1.

If no programmed information is stored in the play area 10, then the CPU 1 determines whether there is programmed information stored in the program area 9 in the current magazine memory area CUMM in a step S51.

If there is programmed information stored in the program area 9 in the current magazine memory area CUMM, then the CPU 1 transfers the programmed information from the current magazine memory area CUMM to a program area in the play area 10 in a step S52. This is because a reproducing operation is effected on the basis of programmed information recorded in the program area in the play area 10. Control then goes to the normal processing routine A1.

If no programmed information is stored in the program area 9 in the current magazine memory area CUMM with no programmed information in the program area of the play area 10, then control goes from the step S51 to the normal data processing routine A1. In this case, the reproducing operation is made according to the key data.

The aforesaid various routines are repeated to effect various control operations on the CD player.

FIGS. 9a to 9d show flowcharts of a playback control sequence of an information reproducing system according to another embodiment of the present invention. Actually, the playback control sequence shown in FIGS. 9a to 9d is a modification of the playback control sequence illustrated in FIGS. 6a to 6d. The playback control sequence of FIGS. 9a to 9d can create a registering memory area for storing only TOC information and also can add or change data after a magazine has been loaded into the CD player.

Those steps shown in FIGS. 9a to 9d which are identical to those shown in FIGS. 6a to 6d are denoted by identical reference characters, and will not be described in detail.

The flowchart of FIGS. 9a to 9d differs from the flowchart fo FIGS. 6a to 6c in that steps S54 through S60 are added to the special processing routine A2-2 (FIG. 6c).

The added steps S54 through S60 will now be described below

It is assumed that after a magazine has been loaded into the CD player, playback control information (i.e., TOC information and programmed information) with respect to the CDs stored in the magazine has already been read in the current magazine memory area CUMM and the registering memory area MM1.

Figure 9A:
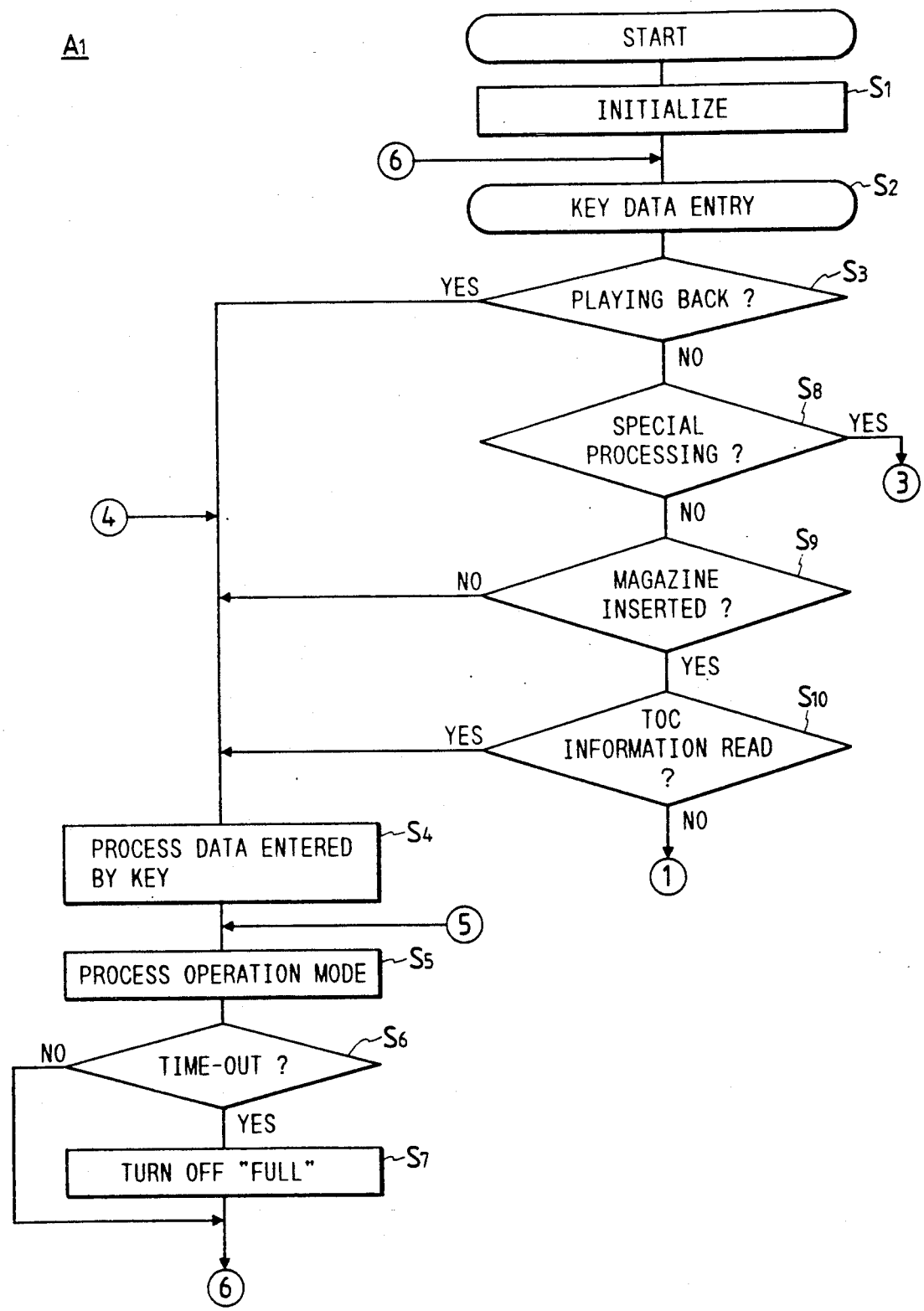
Figure 9C:
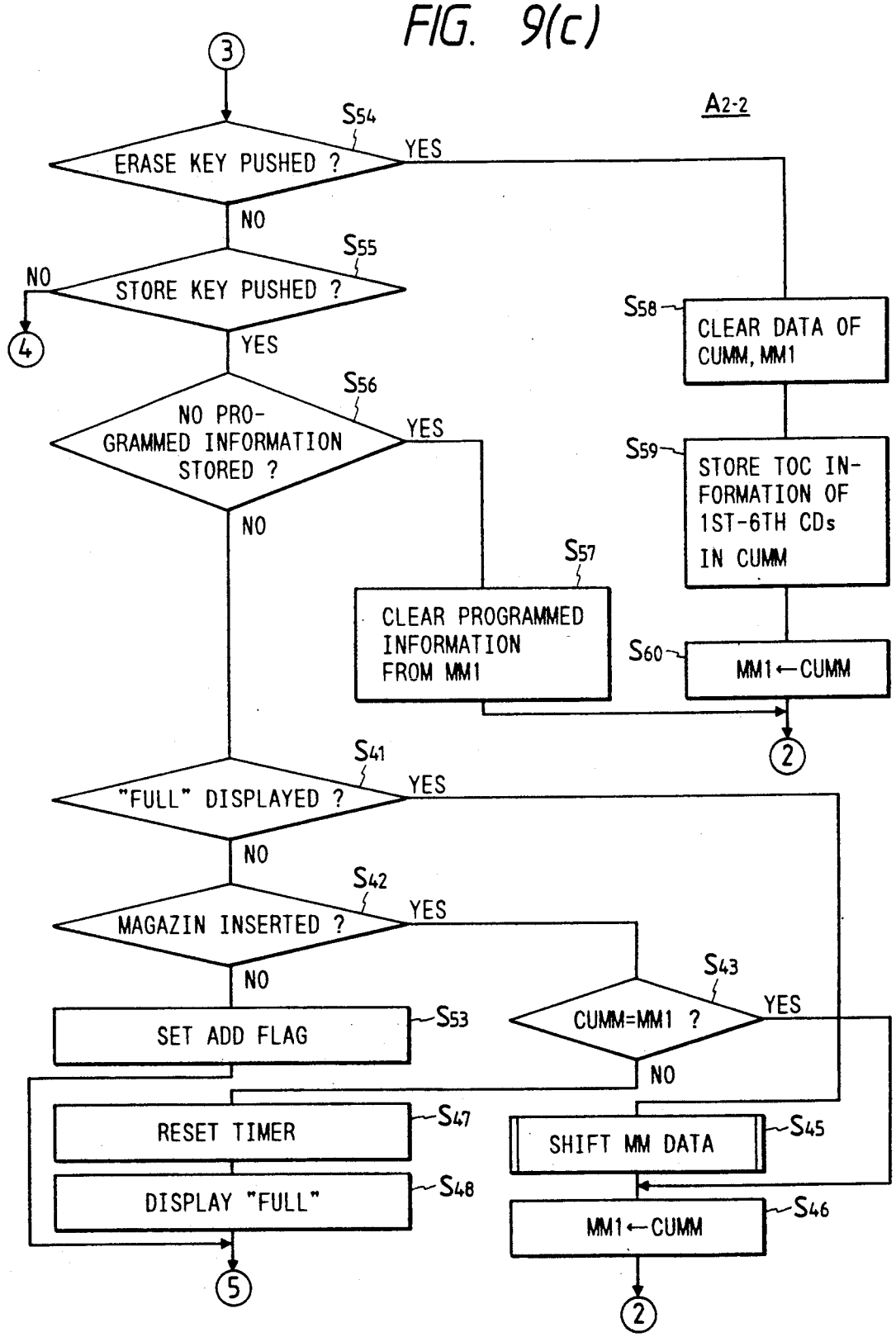
Figure 9D:
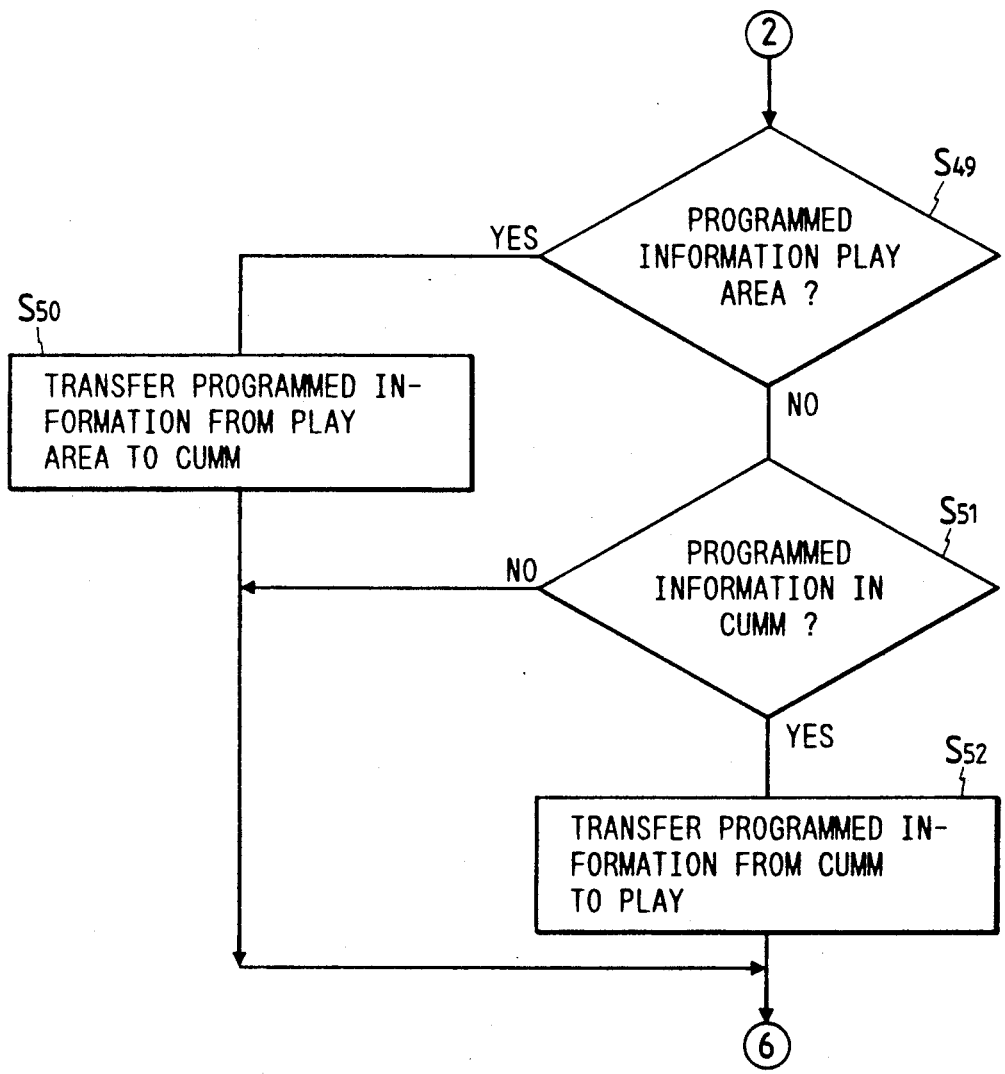

If the CPU 1 determines that special processing is required, then control goes to the stored data processing routine A2. The CPU 1 first determines whether an ERASE key for erasing the data from the registering memory areas is pushed or not in a step S54 (FIG. 9c).

If the ERASE key is not pushed, then the CPU 1 determines whether the STORE key is pushed or not in the step S55.

If the STORE key is pushed, then the CPU 1 determines whether programmed information is stored in the program area 9 in the current magazine memory area CUMM in a step S56.

If programmed information is not written in the programmed area 9 in the current magazine memory area CUMM or programmed information is erased from the program area 9, then the CPU 1 clears the programmed informtion from the resistering memory area MM1 in a step S57.

Therefore, the registering memory area MM1 only stores the TOC information with respect to each of the CDs stored in the magazine. Accordingly, a registering memory area for storing only TOC information can easily be created.

If programmed information is stored in the program area 9 in the current magazine memory area CUMM, then the step 41 continues a sequence identical to that shown in FIG. 6(c).

If the ERASE key is depressed, then the CPU 1 clears all data from the current magazine memory area CUMM and the registering memory area MM1 in a step S58. Then, the CPU 1 newly reads TOC information relative to the first through sixth CDs into the TOC information registering area in the current magazine memory area CUMM in a step S59, and transfers all data from the current magazine memory area CUMM to the registering memory area MM1 in a step S60.

In this manner, data can easily be added or changed after the magazine has been loaded into the CD player.

In the above embodiments, only one item of data with respect to one combination of CDs is stored in the registering memory areas MM1 through MMn. However, it is also possible to store a plurality of data with respect to one combination of CDs.

While the external RAM and the internal RAM are distinguished from each other in the above description, they may be constructed as one memory.

The playback control unit may be arranged such that when data are changed or added, only the added or changed data may be processed.

The foregoing embodiments are specifically directed to the multidisk CD player. However, the present invention is also applicable to various other players such as DAT and LVD players, for example, which employ recording mediums having TOC information or control data that are equivalent to TOC information.

With the present invention, as described above, a group of loaded recording mediums are determined by a recording medium checking means based in TOC information relative to the recording mediums, programmed information established with respect to the recording mediums is read from a programmed information storing means by a program reading means based on the result of determination by the recording medium group checking means, and playback operation of the recording mediums is controlled by a playback control means based on the programmed information which has thus been read. If programmed information with respect to the loaded recording mediums has been stored, then it is not necessary to read in TOC information and establish programmed information. Therefore, the playback operation can immediately be controlled based on the stored programmed information.

The playback control means has a programmed information checking means which determines whether there is new programmed information relative to the group of recording mediums. If there is such new programmed information, the playback operation of the recording mediums can be controlled according to the new programmed information by employing only the stored TOC information. Therefore, even when new programmed information is established, the playback operation can quickly be controlled.

Although certain preferred embodiments have been shown and described, it should be understood that many changes and modifications may be made therein without departing form the scope of the appended claims.

What is claimed is:

1. An information reproducing system for playing back a group of recording mediums according to programmed information, each recording medium having recorded information to be reproduced and Table of Contents (TOC) information with respect to the recorded information, said information reproducing system comprising:

means for reading the TOC information of the recording mediums before the recorded information is reproduced;

information storing means for storing the TOC information and programmed information which indicates a sequence according to which the recorded information of the recording mediums is to be reproduced, wherein said storing means comprises a first RAM having a play area in which reproducing data are stored and a second RAM having a current magazine memory area for storing playback control information corresponding to said group of recording mediums;

recording medium group checking means for determining the group of recording mediums based on the TOC information;

program reading means for reading the programmed information from said information storing means corresponding to the group determined by said recording medium group checking means; and playback control means for controlling playback operation of the recording mediums based on the read programmed information, said playback control means comprising programmed information checking means for determining whether there is new programmed information in said play area corresponding to said group of recording mediums, and, if there is new programmed information, for controlling the playback operation of the recording mediums based on the new programmed information stored in said play area, wherein said first RAM has a plurality of registering memory areas having the same structure as that of the current magazine memory area, end each of said play area, current magazine memory area and registering memory areas has a condition checking data area for checking conditions of said second RAM and reproducing process, a magazine indentification data, a TOC information registering area and a program area.

2. An information reproducing system according to claim 1, wherein, if there is no new programmed information in the play area of the first RAM, a checking means determines whether there is programmed information in the current magazine memory area or not, and, if yes, the programmed information in the current magazine memory area is transferred therefrom to the play area of the first RAM, and, if no, a reproducing operation is excuted by a key operation.

3. In an information reproducing system, a method for playing back a group of recording mediums according to programmed information, each recording medium having recorded information to be reproduced and Table of Contents (TOC) information with respect to the recorded information, said method comprising the following steps:

(a) reading the TOC information of the recording mediums before the recorded information is reproduced;

(b) storing, using a storing means, the TOC information and programmed information which indicates a sequence according to which the recorded information of the recording mediums is to be reproduced, wherein said storing means comprises a first RAM having a play area in which reproducing data are stored and a second RAM having a current magazine memory area for storing playback control information corresponding to said group of recording mediums;

(c) determining the group of recording mediums based on the TOC information;

(d) reading the programmed information from said information storing means corresponding to the group determined in step (c); and (e) controlling playback operation of the recording medium based on the read programmed information, and determining whether there is new programmed information in said play area corresponding to said group of recording mediums, and, if there is new programmed information, then controlling the playback operation of the recording mediums based on the new programmed information, wherein said first RAM has a plurality of registering memory areas having the same structure as that of the current magazine memory area, and each of said play area, current magazine memory area and registering memory areas has a condition checking data area for checking conditions of said second RAM and reproducing process, a magazine identification data, a TOC information registering area and a program area.

* * * * *